United States Patent [19]

Coker et al.

[11] Patent Number: 4,581,758

[45] Date of Patent: Apr. 8, 1986

[54] ACOUSTIC DIRECTION IDENTIFICATION SYSTEM

[75] Inventors: Cecil H. Coker, Chatham; David R. Fischell, Tinton Falls, both of N.J.

[73] Assignee: AT&T Bell Laboratories, Murray Hill, N.J.

[21] Appl. No.: 549,258

[22] Filed: Nov. 4, 1983

[51] Int. Cl.[4] .............................................. H04M 1/00
[52] U.S. Cl. ....................................... 381/56; 381/92; 367/125; 179/18 BC
[58] Field of Search ........................ 381/94, 92, 71, 56, 381/57; 179/81 B, 100 L, 18 BC, 107 FD, 121 D; 367/125; 328/109; 340/988

[56] References Cited

U.S. PATENT DOCUMENTS 3,878,381  4/1975  Broder et al. .................... 367/125 X
4,031,501  6/1977  Caruso ............................ 367/125 X
4,131,760 12/1978  Christensen et al. ............... 179/1 P

FOREIGN PATENT DOCUMENTS 1318044  5/1973  United Kingdom .

Primary Examiner—James L. Dwyer
Attorney, Agent, or Firm—Samuel R. Williamson

[57] ABSTRACT

A system insensitive to nonspeech sounds utilizes a pair of spatially separated microphones to obtain the direction of origin of speech signals from a common sound source. The speech signal from each microphone is transformed into a pulse representative signal having a rapid increase responsive to pitch peaks of energy from the sound source. The cross correlation of these pulses accurately reflects the phase relationship between the speech signals arriving at the microphones. The cross correlation is implemented as time interval histograms which are periodically read to identify the direction of the common sound source.

36 Claims, 12 Drawing Figures

LED LEVEL INDICATOR

MICROCOMPUTER
MEMORY AND TIMING

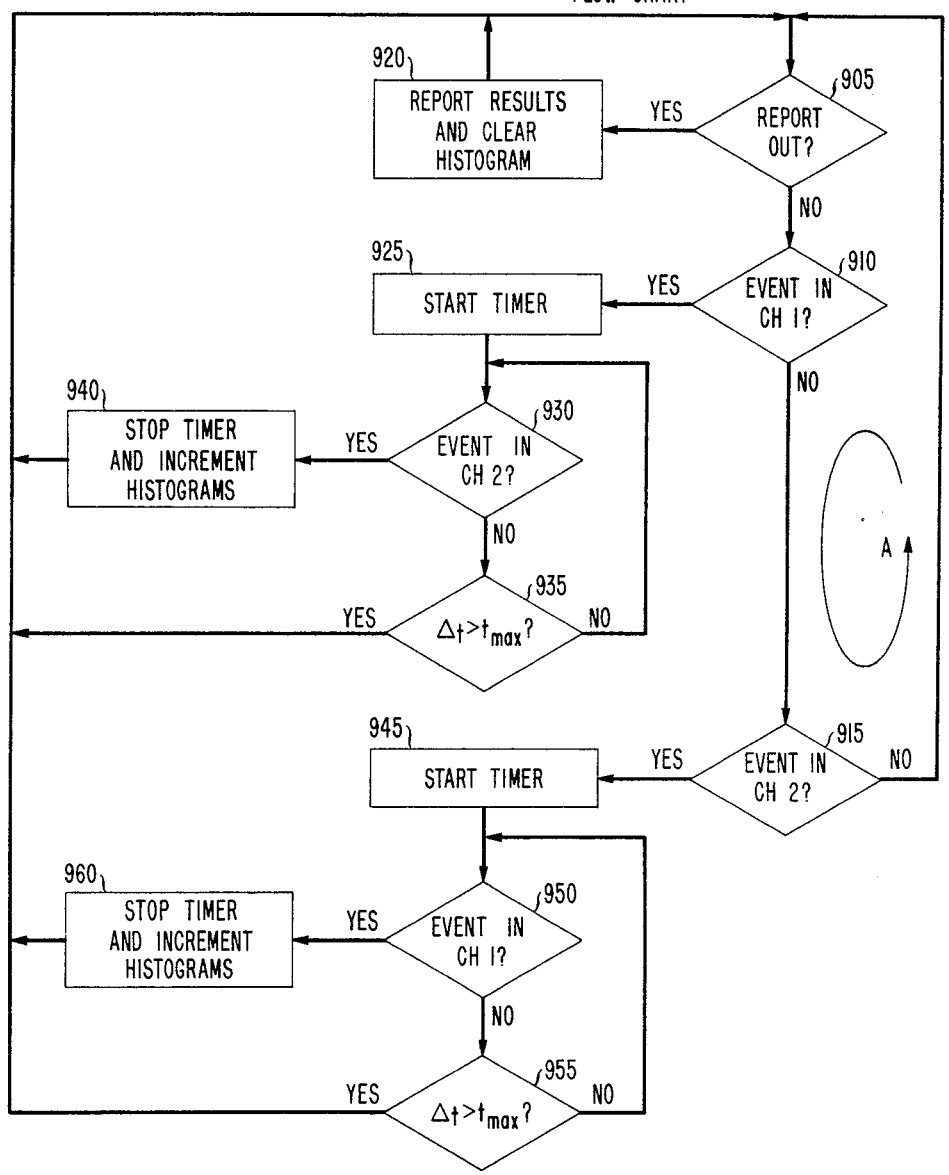

ACOUSTIC DIRECTION IDENTIFICATION SYSTEM

BACKGROUND OF THE INVENTION

1. Technical Field

This invention relates to acoustic signal processing and more particularly to signal discriminating arrangements for identification and verification of the direction of sound sources.

2. Description of the Prior Art

In telephone and other audio communication systems, sound applied to an electroacoustic transducer from a single source may traverse a plurality of diverse paths between the source and the transducer. In addition to the direct-path signal, other signals caused by delay reflections from surrounding surfaces, as well as extraneous sounds, reach the transducer. The combination of direct, reflected and extraneous signals degrade the quality of the communication system. These effects are particularly noticeable in environments such as classrooms, conference rooms or auditoriums. To maintain good quality, it is a common practice to use transducers such as standard microphones in close proximity to the sound source or to use directional microphones. These practices enhance the direct-path acoustic signal with respect to noise and reverberation signals.

There are many systems, however, in which the direction of the sound source is variable or unpredictable. In conferencing arrangements, for example, a plurality of speakers in a room are served by a speakerphone set. The direction of sound is variable and the room reflections are generally not controlled. Consequently, adverse effects are distinctly noticeable and some electronic arrangement must be used to reduce noise and reverberation without changing room conditions.

One type system in the known art for reducing multipath reverberative interference utilizes two or more spatially separated microphones, each receiving different versions of the same sound. The microphone outputs are directly combined so that reverberative effects are minimized. In another arrangement, the signals from a plurality of spatially separated microphones are processed to select the signal having the least reverberative interference. These arrangements, however, require that one microphone be substantially closer to the sound source than the other microphones of the system. Other techniques use spectral analysis to select spectral portions of each of a plurality of microphone signals. The selected spectral portions are combined to produce a composite signal with reduced reverberation. The spectral techniques, however, employ relatively complex apparatus to partially reduce the echo effects.

A more direct solution to the reverberative interference problems is disclosed in U.S. Pat. No. 4,131,760, issued to S. W. Christensen et al. on Dec. 26, 1978 and is assigned to the same assignee. In accordance with this patent, sound from a source is received by a pair of spatially separated microphones to obtain speech signals. Each one of the speech signals is transformed into an envelope representative signal having rapid increases responsive to direct-path and echo energy bursts from the sound source and exponential decaying portions between energy bursts. A first pulse corresponding to a sound source direct-path energy burst is generated responsive to the first speech signal exceeding its envelope representative signal, and further first pulses corresponding to echo bursts are inhibited for a predetermined time. A second pulse corresponding to the sound source direct-paath energy burst is generated responsive to the second speech signal exceeding its envelope representative signal, and further second pulses corresponding to echo bursts are inhibited for a predetermined time. The first and second speech signals are aligned in phase responsive to the time difference between said first and second pulses.

The foregoing solutions to the noise and dereverberation problems are satisfactory as long as the individual sound sources are well separated. Where it is necessary to conference a large number of individuals, for example, the audience in an auditorium, the foregoing methods do allow noise and reverberation to affect the sound source somewhat since these techniques are not arranged to exclude sounds from all but the direction of origin of a desired source. It is thus desirable to provide an arrangement with improved audio signal discrimination in identification and verification of the direction of a desired sound source in a noisy reverberant environment.

SUMMARY OF THE INVENTION

The invention is directed to an acoustic signal processing system which utilizes a pair of spatially separated microphones to obtain the direction of origin of speech signals from a common sound source. The speech signal from each microphone is transformed into a pulse representative signal having a rapid increase responsive to pitch peaks or energy bursts from the sound source. The corresponding pulses of the two speech signals are phase related and transformed into a signal that is insensitive to nonspeech sounds and is used in determining the direction to the common sound source. Operation of the invention is such to give strong preference to direct-path early arriving energy bursts over later arriving reflections thereby providing audio signal discrimination, and to produce a stream of pulses whose cross-correlation is employed in building time interval histograms which are periodically read to identify the direction to a person speaking. This system thus allows for operations such as mechanical or electrical aiming in real time of directional microphones and thereby significantly reduces noise and reverberations by excluding sounds from all but the direction of origin of the desired source. Automatically aiming a close-up television camera of the type used in video teleconferencing is also possible.

BRIEF DESCRIPTION OF THE DRAWING

The invention and its mode of operation will be more clearly understood from the following detailed description when read with the appended drawing in which:

FIG. 8 illustrates the spatial arrangements of FIGS. 3 through 8;

FIG. 9 illustrates in flowchart form a process in accordance with the principles of this invention, such process may be embodied in the structure illustrated in FIG. 1;

DETAILED DESCRIPTION

Figure 1:
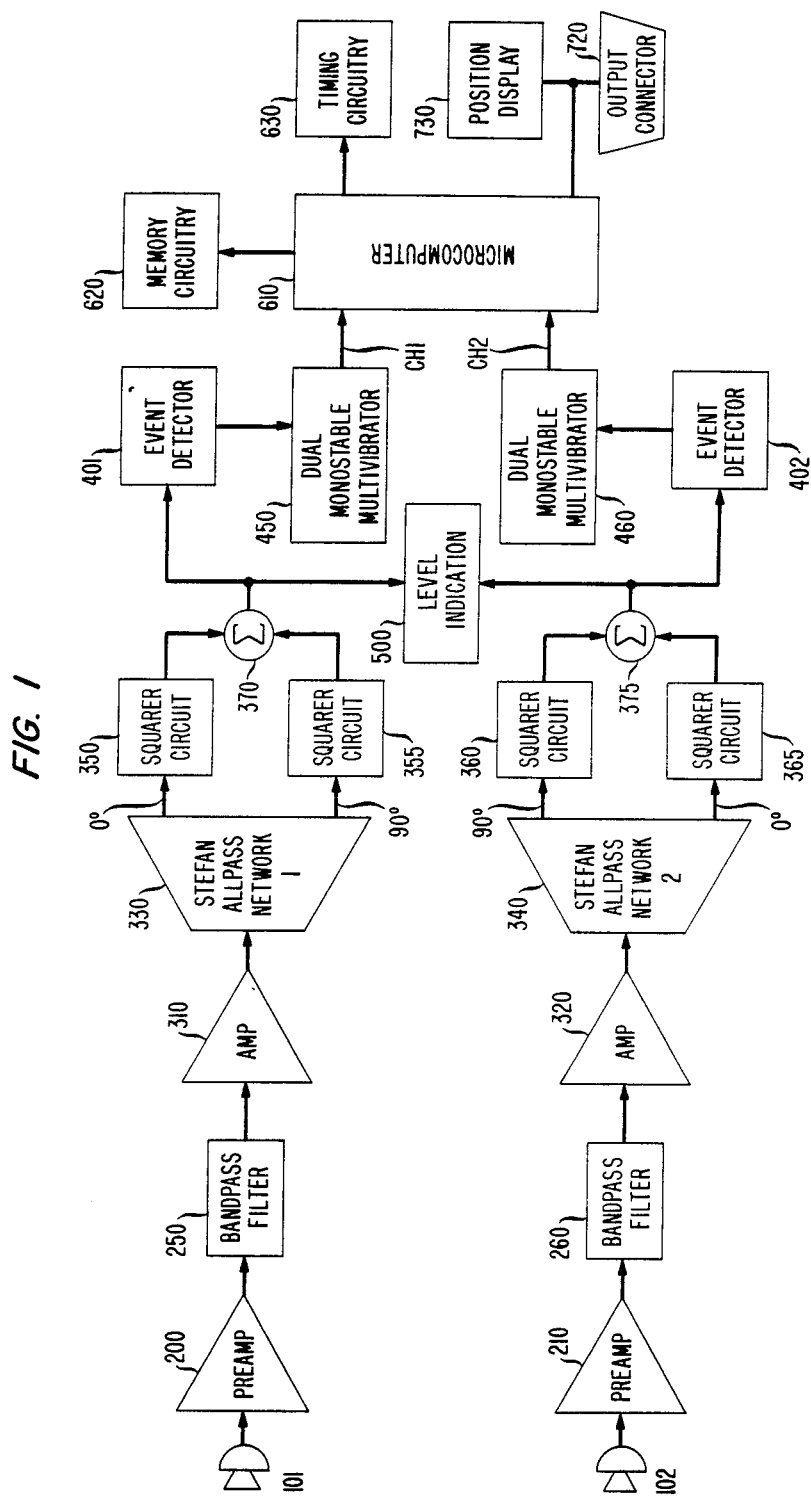
FIG. 1 is a functional block representation of an acoustic direction identification system operative in accordance with the principles of the present invention.

FIG. 1 is a functional block representation of an acoustic direction identification system operative in accordance with the principles of the invention. As shown, the identification system comprises microphones 101 and 102 that are respectively connected to amplifiers 200 and 210. These microphones are located a reasonable distance apart, typically 2½ feet, to aid in the identification and verification of the direction of sound sources. This system is divided into two channels with microphone 101 providing the input to channel 1 and microphone 102 providing the input to channel 2. And preamplifiers 200 and 210 are employed to respectively increase the signal levels from microphones 101 and 102 to a reasonable level.

The output of preamplifiers 200 and 210 is respectively provided to associated bandpass filters 250 and 260 for removing the low-frequency components of speech which are often out of phase with the higher frequency components, and to reduce the width of the peaks for later ease of detection. These filters also eliminate high-frequency noise which can produce unwanted spurious events.

Amplifier 310 provides some additional filtering and impedance buffering for the signal in channel 1 as it couples the signal from bandpass filter 250 to a Stefan all-pass network 330. Similarly, amplifier 320 processes the signal in channel 2 as it couples the signal from the bandpass filter 260 to a Stefan all-pass network 340.

The bandpassed speech in the two channels is separately Hilbert transformed by the Stefan all-pass networks 330 and 340 to produce two signals with the same amplitude but phased 90 degrees apart from each other. These signals are next separately squared by associated squarer circuits 350, 355, 360 and 365. The signals for channel 1 are then summed in summer 370 and those for channel 2 summed in summer 376. The phase splitting, squaring and summing of the bandpassed speech provide a waveform which has a very sharp rise in time at the actual location of the pitch peaks of speech and thereby facilitate in accurately detecting the delay in the time it takes sound impinging first upon one microphone to reach the other.

The output of the summers 370 and 375 are jointly coupled to a level indication circuit 500. This circuit operates as a six-level detector providing six levels of sensitivity for both channels 1 and 2.

The summers 370 and 375 are also coupled to event detectors 401 and 402, respectively. These event detectors transform the pitch peaks in the speech envelope into energy burst coincident pulses. In order to avoid nonpitched spurious events being detected by the system, and also in order to increase the insensitivity to nonspeech sounds, the output of the event detectors 401 and 402 are respectively coupled to dual monostable multivibrators 450 and 460. These multivibrators each provide a digital pulse train of energy burst pulses in which the time delay between corresponding pitch peaks impinging upon the two microphones gives the sought after time delay between microphones.

Microcomputer 610 processes in real time the two digital pulse trains from the dual monostable multivibrators 450 and 460. Through use of histograms, which are continually updated memories reflecting the time delay occurring for each correlated event, the identification and verification of the direction of sound sources is available to a high degree of accuracy in real time. Under the control of timing circuitry 630 the microcomputer 610 uses random access memory circuitry 620 to store initial data reflecting the direction of origin of speech sound. As the speech sound continues to occur from the same source, all in a very short time period, the microcomputer 610 accumulates this subsequent data and combines it with the earlier data in building a time interval histogram. As the value of the stored data exceeds a predetermined threshold for identification, good identification is assumed to be made by the microcomputer. A signal output corresponding to the speaker's direction is then provided to an output connector 720 for connecting to other systems for transmission to remote locations or other uses as desired. To aid in setup and verifying proper operation, a position display 730 for reflecting the angular location from the microphones to a person speaking in a room is provided.

Figure 2:
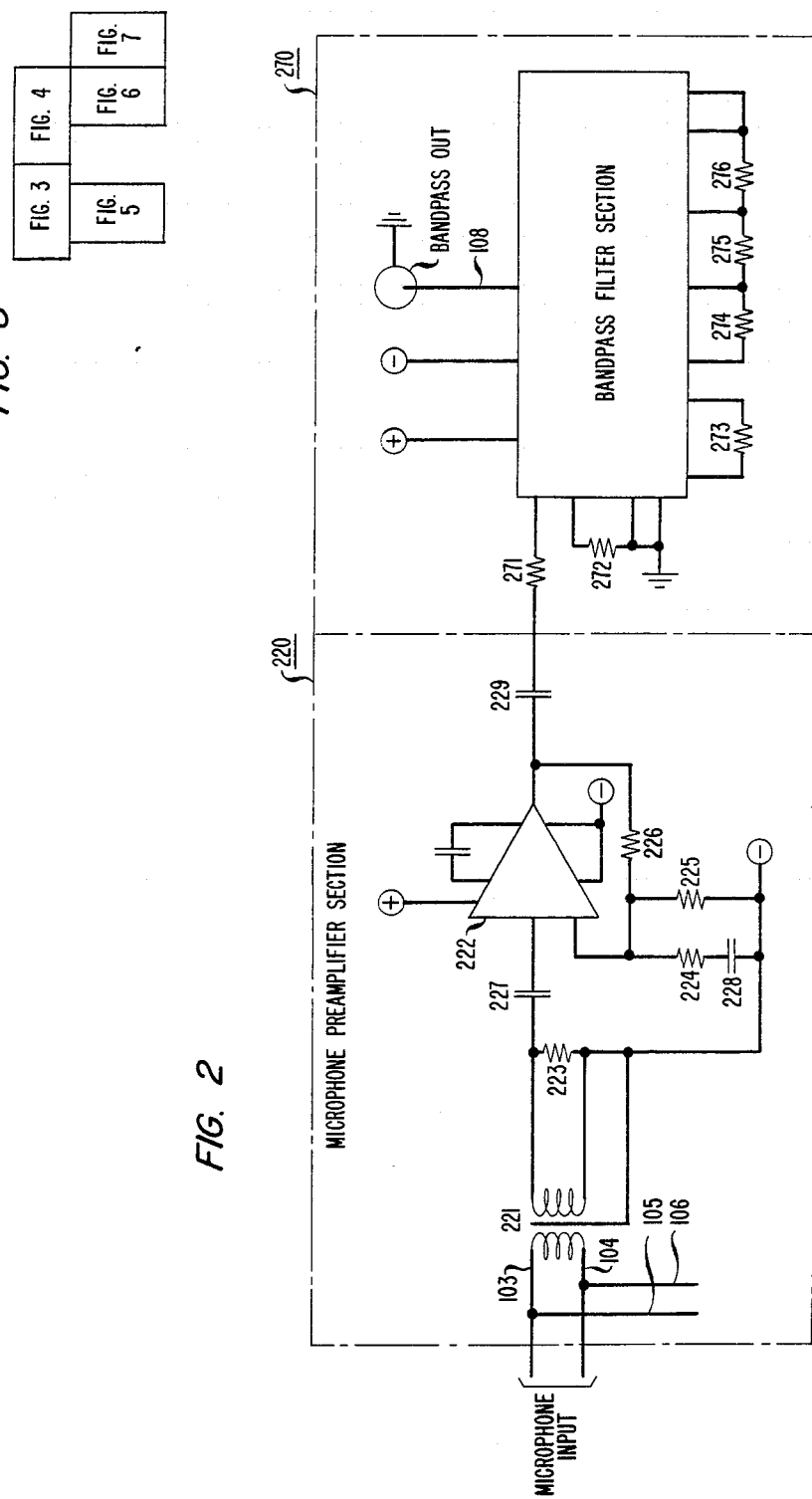
FIG. 2 shows a schematic diagram of a microphone preamplifier section and a bandpass filter section suitable for use in this invention.
Figure 10:
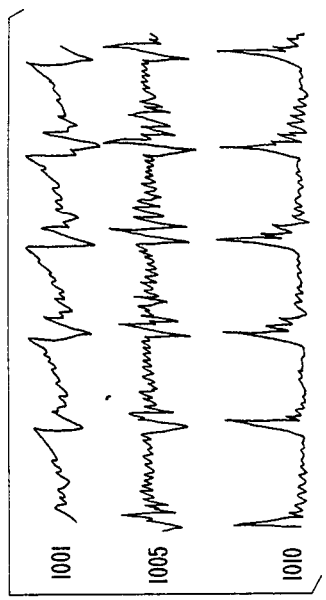
FIG. 10 shows waveforms which illustrate the operation of the circuitry of FIGS. 2 and 3.

Referring now to FIG. 2, there is shown a microphone preamplifier section 220 and a bandpass filter section 270 both suitable for use in the arrangement of FIG. 1 as preamplifiers 200 and 210 and bandpass filters 250 and 260, respectively. Reference to the waveforms shown in FIG. 10 is also recommended for ease in understanding the operation of these sections. Operation of the acoustic direction identification system relies upon the presence of periodic peaks in the input speech signal as are shown in waveform 1001 of FIG. 10. The speech signal containing these peaks is provided via input lines 103 and 104 to lines 105 and 106 for transmission to remote locations as desired, and to a transformer 221. Although the system operates satisfactorily with a pair of standard microphones, operation is enhanced with a linear array microphone of the type disclosed in U.S. Pat. No. 4,311,874, issued to R. L. Wallace on Jan. 19, 1982. The transformer 221 couples the audio signal to a low noise operational amplifier circuit consisting of amplifier 222, resistors 223 through 226 and capacitors 227 through 229.

The output of the microphone preamplifier section 220 is coupled to the input of bandpass filter section 270 which may be conveniently obtained in integrated circuit form with resistors 271 through 276 having values set to give 6 dB fall-off points at 1 kHz and 8 kHz. This filter section removes the low-frequency components of speech which are often out of phase with the higher frequency components, and reduces the width of the signal peaks aiding in their detection. The bandpass filter also eliminates high-frequency noise and thereby avoids producing unwanted spurious events. Waveform 1005 in FIG. 10 shows the bandpassed speech signal output present on line 108 of FIG. 2.

Figure 3:
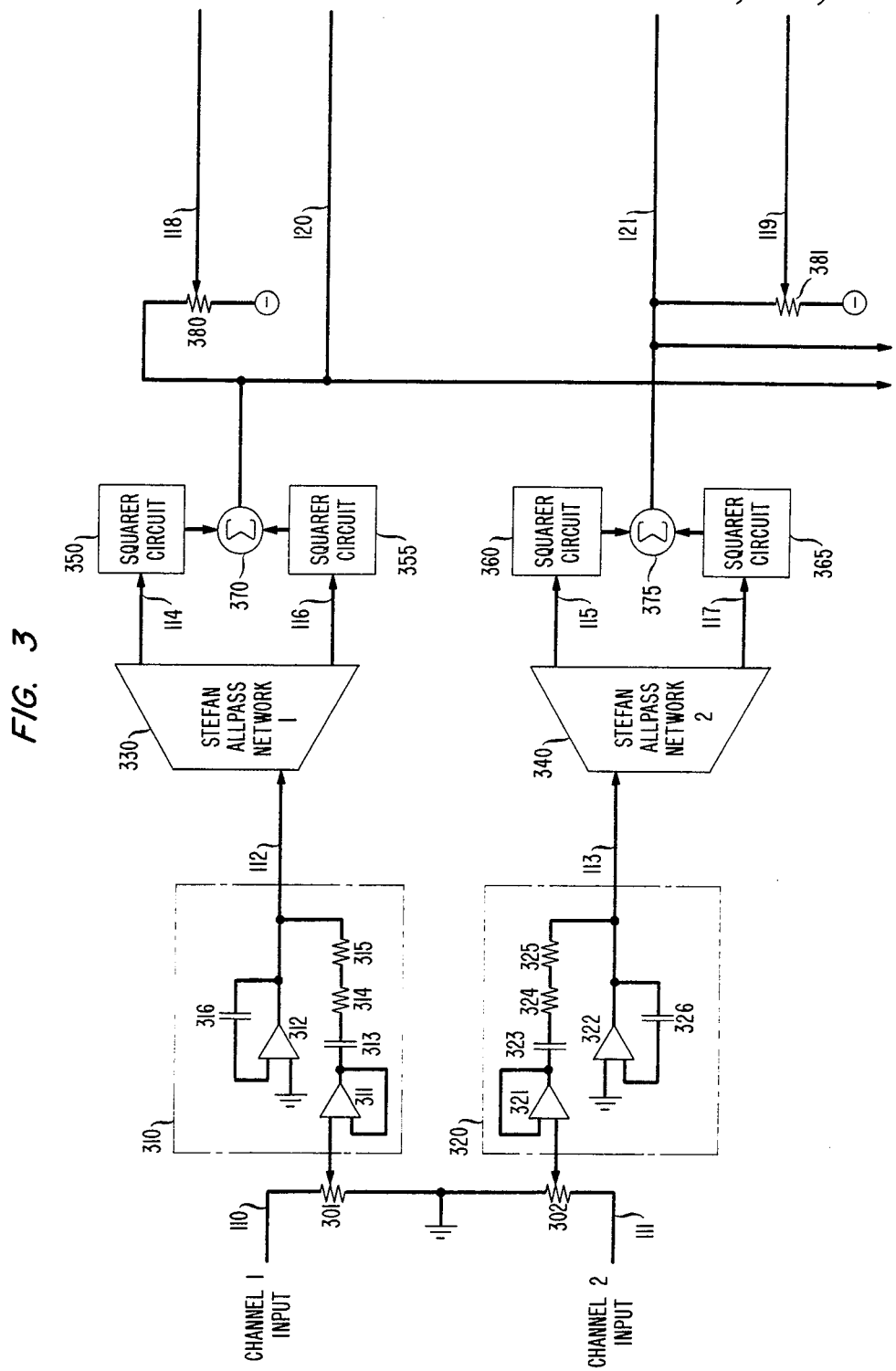
FIG. 3 is a schematic diagram of an envelope generator employed in this invention.

Shown in FIG. 3 is an envelope generator which provides very sharp peaks for accurately marking the occurrence of the pitch peaks in speech. This envelope generator comprises amplifiers 310 and 320, Stefan all-pass networks 330 and 340, squarer circuits 350, 355, 360 and 365, and two summer circuits 370 and 375. The generator uses as input a pair of bandpassed speech signals such as that provided by the preamplifier section 220 and bandpass filter section 270 of FIG. 2. These input signals are provided over input lines 110 and 111 as channel 1 and channel 2, respectively, with both having a common ground reference. The envelope detector circuitry of channel 1 and channel 2 are identical with channel 1 being described in detail herein. For an understanding of the operation of the circuitry of channel 2, reference to the same named or similar configurated component of channel 1 is recommended.

The input signal on channel 1 is coupled to the amplifier 310 via a variable resistor 301 which is used for adjusting the level of the input speech signal. Amplifier 310 comprises operational amplifier 311, which is used in a follower configuration to provide a high output impedance, and also operational amplifier 312, which provides additional filtering to the speech signal. Also included in amplifier 310 are capacitor 313 and resistors 314 and 315 which are associated with operational amplifier 311, and capacitor 316 which is associated with operational amplifier 312.

The output of amplifier 310 is coupled over line 112 to the Stefan all-pass network 330 where it is first Hilbert transformed to produce two signals with the same amplitude but phased 90 degrees apart over the bandpassed frequency range of 1 kHz to 8 kHz. One of these signals is considered a zero-degree phase shifted signal and is provided over line 114 to squarer circuit 350. The other is considered a 90-degree phase shifted signal and is provided over line 116 to squarer circuit 355. Each of these signals are squared in the squarer circuits 350 and 355 which comprise four quadrant analog multipliers that are commercially available from Motorola as part No. MC1494. The squared signals are then summed in the summer circuit 370 creating the envelope shown in waveform 1010 of FIG. 10 which has a very sharp rise in time at the actual locations of the pitch peaks of speech.

Some positive dc voltage offset will usually occur on the speech envelope. For example, a pure sinusoid input sin w t, will produce sin w t and cos w t as the zero-degree and 90-degree phase shifted signals. And squaring and summing these produces a dc voltage. To counteract this voltage, a negative dc voltage is also added to output line 118 through adjustable resistor 380.

Figure 4:
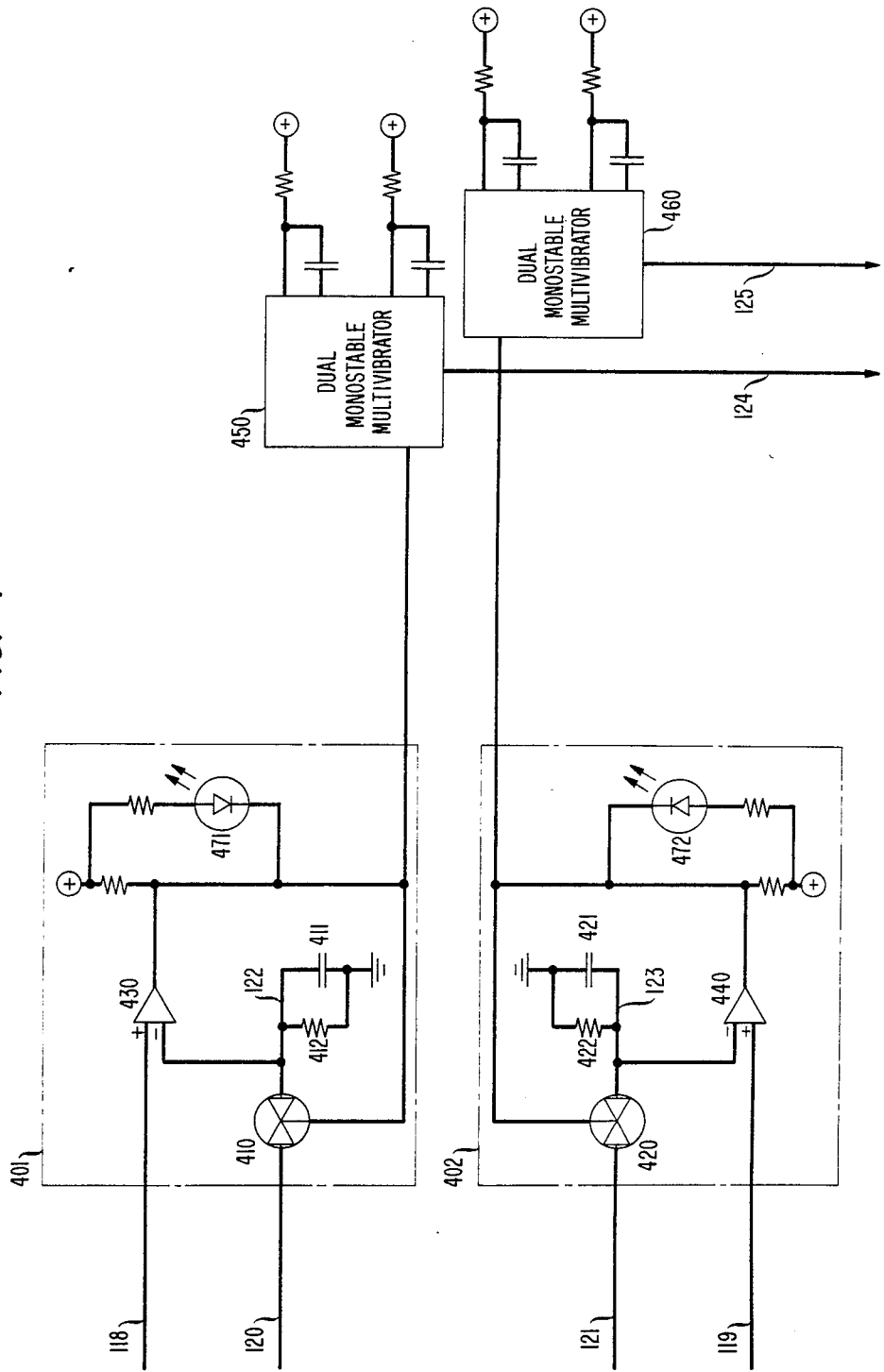
FIG. 4 is a schematic diagram of event detectors and dual monostable multivibrators employed in this invention.
Figure 5:
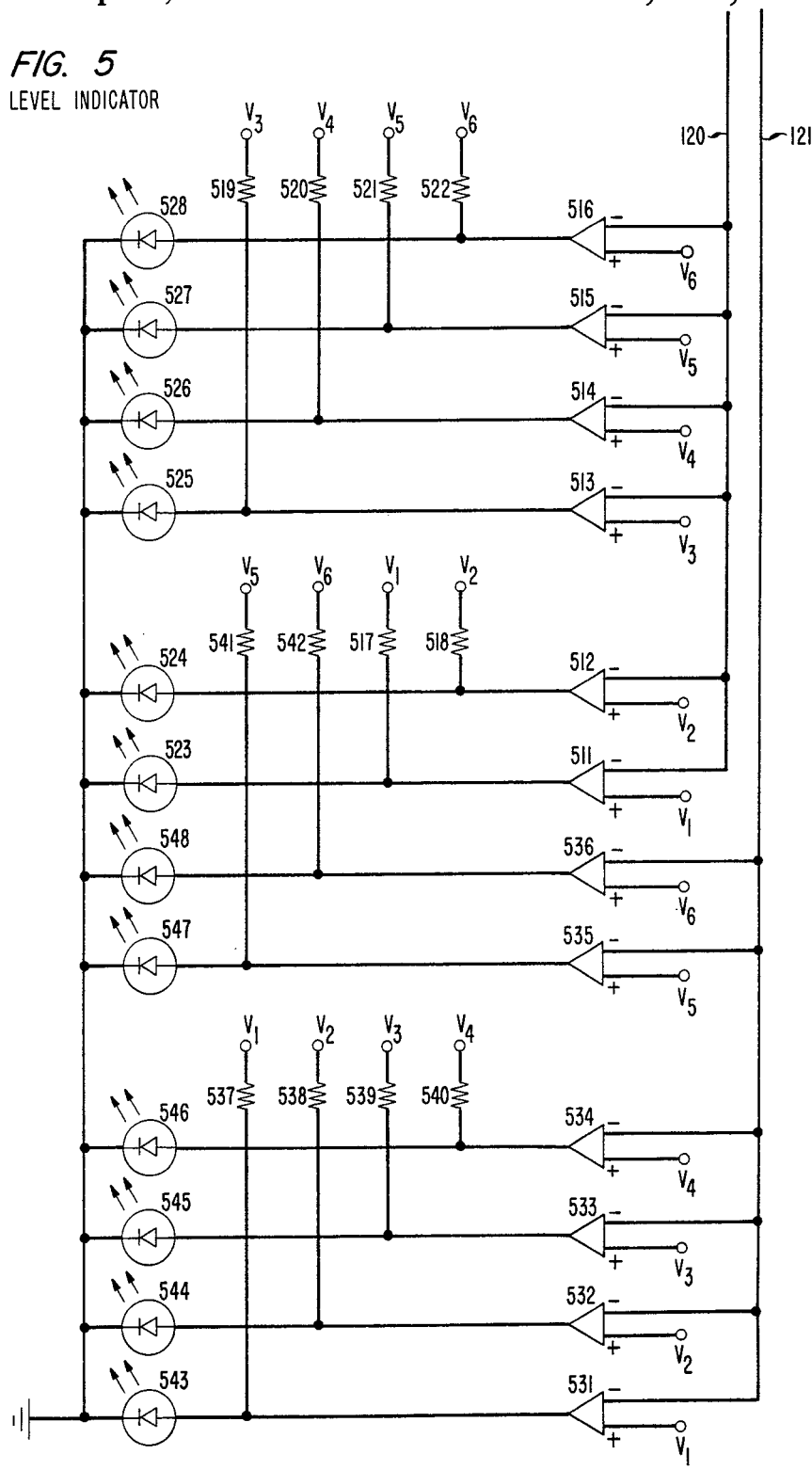
FIG. 5 is a schematic diagram of a level indication circuit employed in this invention.

FIG. 4 shows an event detector for transforming the pitch peaks in the speech envelope into energy burst coincident pulses. The event detector comprises analog switches 410 and 420 and comparators 430 and 440. The speech envelope signal generated by the envelope detector of FIG. 3 is coupled to the event detector over lines 118 through 121. The speech envelope signals for channel 1 are on lines 118 and 120 and those for channel 2 are on lines 119 and 121. Identical event detecting circuitry is used for channels 1 and 2, with only the operation of the circuitry in channel 1 being described herein in detail. Reference to the waveforms depicted in FIG. 10 and FIG. 11 is also recommended.

The speech envelope signal having the waveform 1010 as shown in FIG. 10 is applied to the analog switch 410 and the comparator 430. These signals are identical in envelope representation. The signal line 118, however, has any positive dc offset voltage nulled by the negative dc voltage applied through resistor 380 shown in FIG. 3.

By way of operation, when a pitch peak occurs in the envelope signal, the comparator 430 turns on and closes the analog switch 410 allowing a capacitor 411 to charge to the potential of the speech envelope level. The capacitor 411 in combination with resistor 412 provides an RC time constant that discharges to ground when the potential is removed. This combination produces a decaying envelope which will charge to the speech envelope level when the speech envelope level rises above the decaying envelope level and will decay exponentially when the speech envelope signal falls below the decaying envelope.

Figure 11:
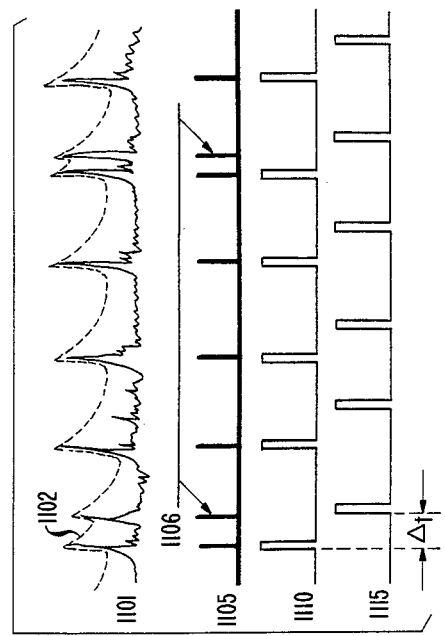
FIG. 11 shows waveforms which illustrate the operation of the circuitry of FIG. 4.

The speech envelope signal, waveform 1010 of FIG. 10 is shown again as waveform 1101 of FIG. 11 along with the superimposed decaying envelope signal present on line 122 of FIG. 4 and labeled as 1102 in FIG. 11. Each time the decaying envelope switches from its exponential decay to its rise, the event detecting circuitry decides that a probable event has occurred, an event being a detectable audio signal received at the microphones such that it arrives at one of the microphones at a given time before it arrives at the other. Digital pulses as shown in waveform 1105 of FIG. 11 are produced in synchronism with such events. The output from the comparator 430 is therefore a digital pulse train which is synchronized to the rising edge of the pitch peaks in the speech envelope signal.

A noise calibration circuit for each channel is also included in the event detecting circuitry of FIG. 4. This circuit is provided for setting the sensitivity of the identification system circuitry so that the system is insensitive to ambient room noise. This is achieved by having all participants in the room remain silent for a moment while the noise threshold potentiometers 380 and 381 are adjusted such that no events occur in the system from local air conditioning or any other ambient noise present. Events are viewed using the lighting of light-emitting diodes 471 and 472.

To obtain an insensitivity to other than speech sounds, the output of comparator 430 is provided to a dual monostable multivibrator 450 capable of being retriggered while activated from a previous triggering signal. In that normal pitches of the human voice, both male and female, fall between 3 and 10 milliseconds, any pulse spacing shorter than 3 milliseconds is probably from a spurious noise source and not from speech sounds. To avoid these spurious or nonpitch events, the first multivibrator eliminates any pulses not preceded by a silent period of at least 3 milliseconds without pulses. How this is achieved becomes apparent from an examination of the waveforms in FIG. 11. The pulses in waveform 1110 are those found on line 124 and can only occur a minimum of 3 milliseconds apart. Thus the two spurious event pulses depicted in waveform 1105 and labeled 1106 are not reproduced by the first multivibrator as is seen in waveform 1110.

The second multivibrator creates the final output pulse that has a uniform width of 100 microseconds. This provides a uniform pulse width for all the information coupled to a microcomputer 610 to be later described. Waveform 1115 shows pulses being generated on line 125 by the pitch peaks detected in channel 2 and how they are delayed, in this example, with respect to the pulses in channel 1. At this point in the circuitry of the acoustic direction identification system, there are two digital pulse trains of events in which the time delay between corresponding events in the two channels gives the sought after time delay between microphones.

The output of channel 1 of the envelope detector of FIG. 3 is connected to the level indication circuit 500 over line 120 and the output of channel 2 is connected over line 121. The level indication circuit operates as a six-level detector providing six levels of sensitivity for both channels 1 and 2. It comprises 12 comparators; comparators 511 through 516, are used in channel 1 and comparators 530 through 536 are used in channel 2. One of six possible reference voltages $V_1$ through $V_6$ is assigned a comparator both in channel 1 and in channel 2 and connected to one of the assigned comparators' two inputs. These voltages are assigned increasing values with $V_1$ being the lowest and $V_6$ being the highest. These same reference voltages are also provided to the opposite side of one of multiple resistors 517 through 522 and 537 through 542 which, in turn, are each connected to the output of an associated comparator. And the signal level on line 120 or 121 comprises the other input to the comparators. As long as the signal level is less than the particular reference voltage level being compared to, the output of the comparing comparator is high and the associated one of multiple light-emitting diodes 523 through 528 and 543 through 548 is turned on. As the signal level exceeds the compared reference level, the output level of that comparator goes to a low level turning off the associated light-emitting diode.

Figure 6:
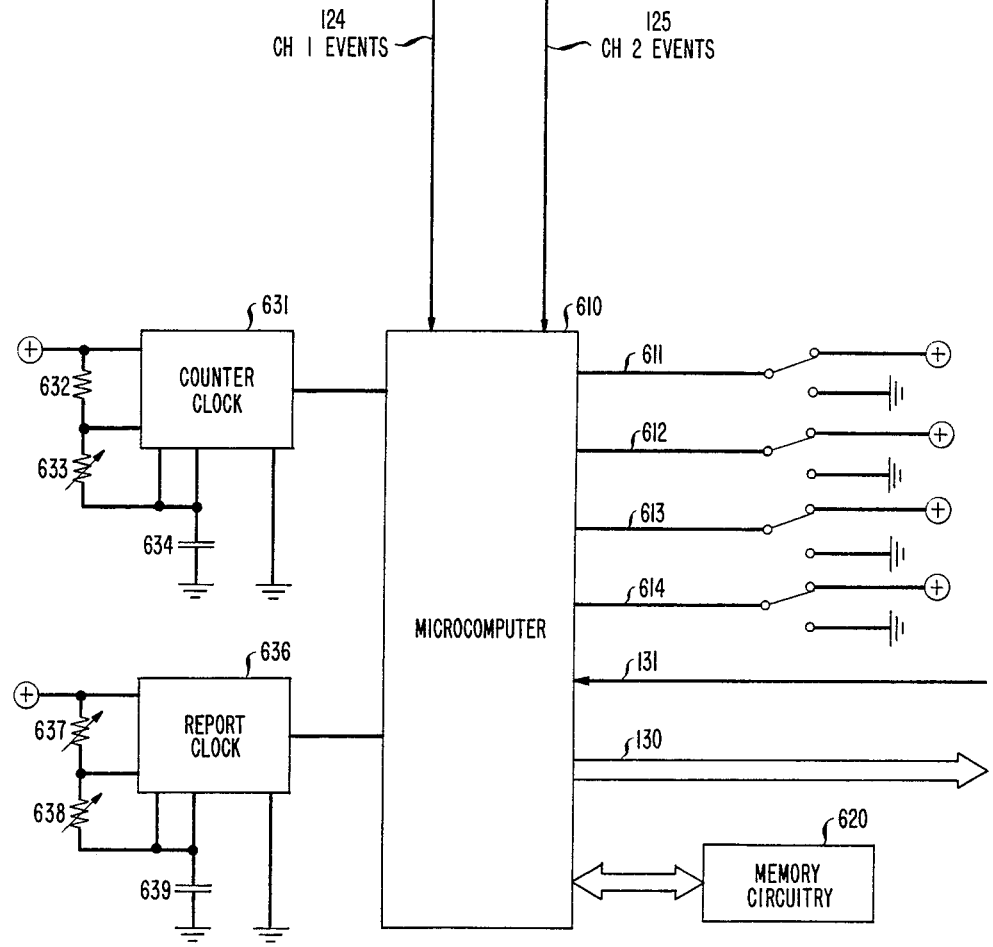
FIG. 6 shows a microcomputer and associated memory and timing circitry suitable for use in this invention.

As seen in FIG. 6, the series of digital pulses from the dual monostable multivibrators 450 and 460 are respectively coupled over line 124 and 125 to a microcomputer 610 for processing. Such a microcomputer suitable for the application described herein is available from INTEL Corporation as Part No. 8748 and can be used with the proper programming. Also included in the design for operation of the microcomputer 610 is an external memory section 620 which has 256 bytes of memory for storing four histograms, each having 63 elements for the system. Providing the necessary timing for the microcomputer 610 is timing circuitry 630 which comprises a first clock 631 and a second clock 636. The first clock with its associated components, resistors 632 and 633 and capacitor 634, provides a 100 kHz reference frequency used by the microcomputer in obtaining the delay between events, that is, the time between the occurrence of an event in channel 1 and an event in channel 2, or vice versa. Setting the clock rate at 100 kHz, for example allows for 256 pulses in the time $T_{max}$ which is 2.56 milliseconds or the time required for sound to travel between the two microphones when they are spaced $2\frac{1}{2}$ feet apart and set to measure a range of angles between zero and 180 degrees.

The computer 610 is easily programmed to reject events with time delays greater than $T_{max}$. For those reported events having delays less than $T_{max}$, the events are considered correlated by the microcomputer 610 and the three least significant bits of the eight bit count are shifted out so as to give a total of 32 possible time divisions. The correct histogram element is found by subtracting the delay from 32 if channel 1 has the first event, or adding it to 32 if channel 2 was first. The second clock 636 with resistors 637 and 638 and capacitors 639 is externally adjustable from 2 to 20 Hertz and is used to govern the frequency of reading and reporting out the contents of the histograms. This clock provides a 1-millisecond pulse to the microcomputer interrupt line whenever it is time to report out the results of a given histogram as is later described in greater detail herein.

For setting the common histogram accept/reject threshold, four single-pole double-throw switches 611 through 614 corresponding to binary levels of 16, 8, 4 and 2 are used. The adjustment of these switches is made in conjunction with the report frequency adjustment as the quantity of importance is the number of correlated events per reporting interval.

From the information provided, the microcomputer 610 calculates a digital signal which indicates the direction from which the incoming speech originated. And it is known that the angle of origin of the speech is proportional to the arc cosine of the time delay. Thus, in order to report out the direction in equal angular increments, look-up tables with the range of angles desired are programmed into an electrical programmable read only memory section of the microcomputer allowing for the arc cosine of the corresponding time delays to be obtained. This provides an equal angular distribution for the different time delays. In addition to a zero to 180 degree look-up table, a second frequently used look-up table embodied in this invention has possible arc cosine values from 45 to 135 degrees for the locating of a sound source originating within this range of angles. And by proper programming, any sound source originating outside of a desired range such as this second range of angles will be ignored by the system. This has the particular advantage of identifying only those people talking from locations prearranged to be valid within a room.

Figure 7:
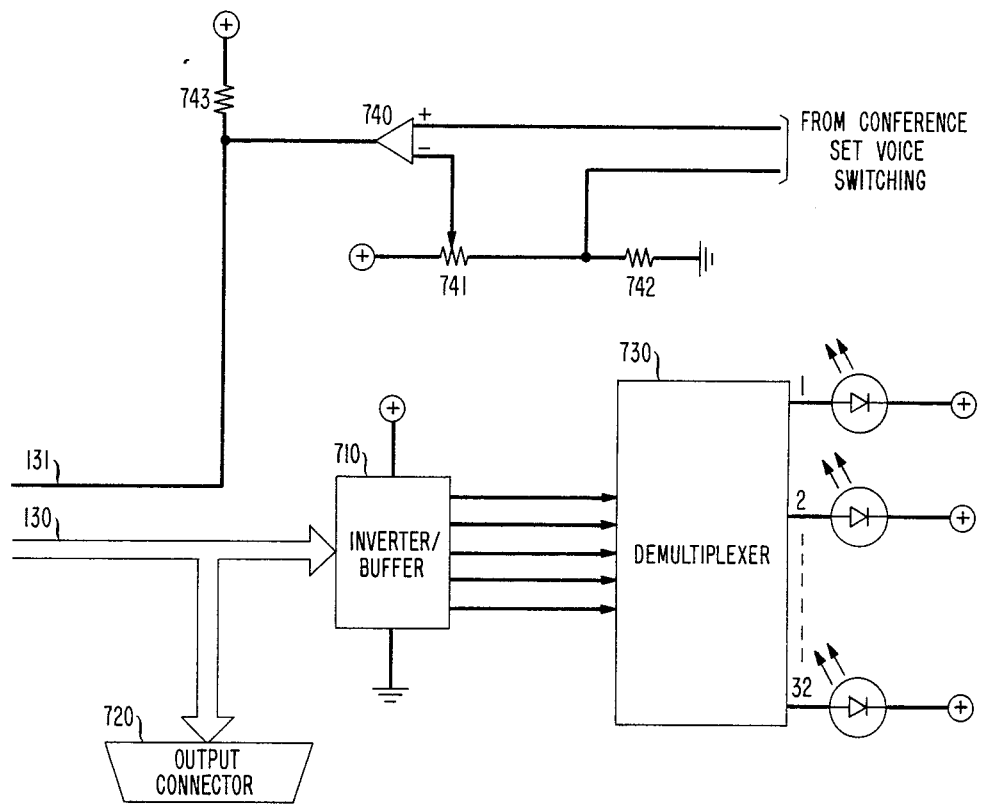
FIG. 7 shows a schematic diagram of a position display suitable for use in this invention.

In order to aid in setup and verifying proper operation, a local position display such as is available with light-emitting diodes is provided and shown in FIG. 7. This position display circuitry is connected to the microcomputer 610 via data bus 130. The five most significant bits from the microcomputer are provided to a buffer and inverter circuit 710 and to an output connector 720 for providing an output signal for the various applications described herein. The output of the buffer and inverter circuit is provided to a demultiplexer circuit 730 which takes the five bits of binary data and decodes it into 32 separate outputs. These 32 outputs each drive light-emitting diodes that are activated to reflect the angular location of a speaker in a room.

When used in a teleconferencing arrangement, it is desirable to disable the system when a voice signal from a remote location is being received. This is accomplished by comparator 740 along with its associated components, resistors 741 through 743, which compare the switch guard voltage in a teleconferencing set with a fixed voltage threshold provided by the resistor divider network comprising resistors 741 and 742. The output of comparator 740 provides this signal to the microcomputer 610 over line 131 and has the effect of causing the microcomputer to ignore any events found and thus cannot identify the loudspeaker.

FIG. 9 is a flowchart illustrating the operation of the acoustic direction identification system. The functions provided by microcomputer 610 are advantageously determined by a process or program stored in the processor portion of the microcomputer 610.

For ease of understanding the flowchart of FIG. 9, reference also to FIG. 10 and the waveforms depicted thereon is suggested. The main loop A in the process looks for events in either channel 1 or channel 2 or a flag from step 905 to signal it is time for step 920 to report out results. If an event is found in one of the channels, for example channel 1, step 910 starts a timer indicated as step 925 and the system will begin looking for an event in the other channel at step 915. If one is found as per step 930, the timer is stopped, the time delay read, and the reading used by step 940 to address the correct elements in the histograms that are used for correlated event memory. These elements are then incremented with the appropriate unit and the system returned to loop A. If no second event is found before the time $t = t_{max}$, which is the maximum time delay possible between the two microphones, step 935 causes the program to return to loop A without changing the histograms.

If during the reporting step 920, the units in an element in a histogram is found to exceed a previously stored accept/reject threshold for identification, then identification of that element is assigned as the speaker's position, and the processor outputs the time delay corresponding to the speaker's position. The histogram is cleared and a pedestal unit to be later described is left in the selected element corresponding to the speaker's position.

The acoustic direction identification system is shown in FIG. 10 utilizing four 63-element histograms 1201 through 1204 which are read cyclicly. Four histograms allow quick identification, in the time $T_{report}$, from one report to the next when the density of events is high, while still providing identification in times as long as $4T_{report}$ if the density of events is low as usually is the case with low level talkers. It will become obvious to those skilled in the art, however, that any number of histograms other than four can be utilized in practicing this invention. In addition, the number of elements in a histogram can also be other than 63. Hence, it is not intended nor should the invention be construed as being limited to any particular number of histograms with a fixed number of elements contained therein. The time delay range spanned by the 63 elements is from $-t_{max}$ to $+t_{max}$ which also for illustration purposes are shown in the present system to correspond to angles of zero through 180 degrees.

Figure 12:
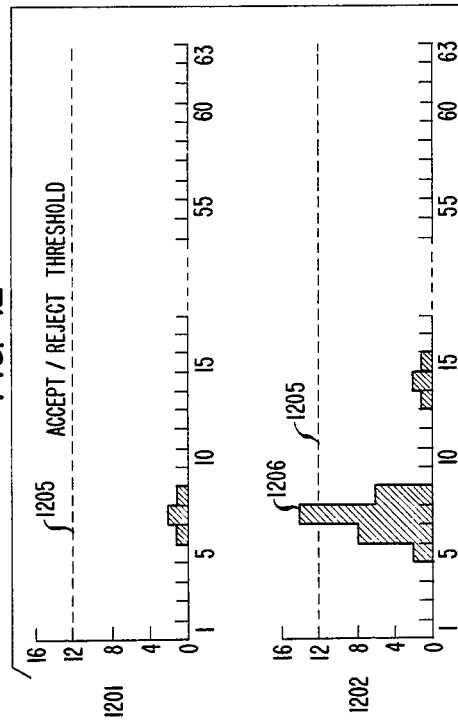
FIG. 12 shows waveforms which illustrate the operation of the microcomputer circuitry of FIG. 6 when employing the flowchart of FIG. 9.

Referring now in greater detail to the operation of the processor in collecting and reporting out data, every time a correlated event is found, the processor increments each of the four histograms by placing a unit level therein. In that the process of incrementing all four histograms takes approximately 200 microseconds, all of the correlated events occurring are detected. With each correlated event found, all four histograms are incremented in the appropriate element which is illustrated on the horizontal axis numbering 1 through 63 in the waveforms 1201 through 1204 in FIG. 12 and corresponds to the time delay measured.

In the reading of a histogram, all of the elements are examined and the one that has the most correlated events stored therein reflects the time delay between the two microphones or the angle from which the speech is coming. In order to ensure that what is being detected is speech and not a correlated event from the air conditioner, a presettable accept/reject threshold 1205 is provided for comparing the level of the incremented elements in the histograms. By this comparison, a determination is made as to whether the information present is sufficient to consider it as being derived from speech sounds. This accept/reject threshold in combination with the 3 millisecond filtering provided by the dual monostable multivibrators 450 and 460 provides a system that is essentially unresponsive to nonspeech sounds.

Under the control of the report clock 636, each histogram is read sequentially at a much slower rate than they ar incremented. By way of example, assuming a sampling time of 1/10th of a second and a time of T equals zero, the first one of the four histograms is read. The element having the larges number of units in this histogram is determined. As earlier indicated, if the units in the element exceed the threshold, an identification is made as to that being a valid location for a person speaking as is the case for pedestal 1206. The entire histogram is then cleared by zeroing out all the elements and a pedestal such as 1207 or 1208 inserted in the location where the identification was made. The same pedestal is also added to the three other histograms. The purpose of this pedestal is to give an advantage to the same talker and aid in reidentifying that talker if he or she continues to speak from the same or a different location.

Between time T equals zero and T equals 1/10th of a second, the system collects data and increments the proper element in all four histograms every time a correlated event occurs. At time T equals 1/10th of a second, the second histogram is examined. The same process is followed in this histogram as in the first. It is examined, the element with the greatest number of units compared with the threshold, the histogram cleared and a pedestal added if a valid identification is amde. The process continues for the next 1/10th of a second collecting data and incrementing all four histograms for each valid correlated event found. At time T equals 2/10ths of a second the third histogram is examined, at time T equals 3/10ths of a second the fourth histogram is examined, and at time T equals 4/10ths of a second the cycle repeats beginning with the examination of the first histogram.

When the histograms are incremented after a correlated event, it was experimentally determined that by incrementing by two the element corresponding to the time delay found, and adjacent elements by one, faster identifications which were also less affected by talker head movements were produced. Thus, as disclosed in this invention, the pedestal unit left in the histograms after a successful identification contains a unit value in the selected element and one-half of that unit value in each adjacent element. Hence, each time a report is required, one of the four histograms is read and 4/10ths of a second worth of information is collected. Moreover, only 1/10th of a second will have elapsed since the last reading was taken. Thus, the system can respond quickly where needed and also can collect data over a long time if necessary.

In addition to those already mentioned, many other applications of this acoustic direction identification system are contemplated and may obviously be implemented by those skilled in the art. For example, a video cursor for use with a remote blackboard is possible. In response to a control signal from the acoustic direction identification system, the cursor would be able to identify participants at a first location for a second location by having the cursor on the blackboard at the second location move to a prearranged position on the blackboard whenever a person speaks from a particular position at the first location.

Using the acoustic direction identification system with a slow scan television is also possible. A remote video cursor is aligned with a particular camera and lens and whoever talks from a given position in the room will cause the cursor to appear above that position on the slow scan monitor at the remote location.

Another possible application would be in an audio switching arrangement for improving the audio in teleconferences. Methods of directing the audio from remote locations into two or more loudspeakers are possible to give the illusion of spatial position to remote talkers. The acoustic direction identification system allows for this without additional audio channels.

Still further is an expanded application of the acoustic direction identification system wherein the combination of two such systems are usable to determine both the azimuth angle and distance to a sound source or, alternatively, the azimuth angle and elevation of the sound source.

Finally, one of the present systems for switching cameras in the PICTUREPHONE ® Meeting Service conferencing system relies on voice switching from individual lavalier microphones hung around the necks of the conferees. The acoustic direction identification system would eliminate the need for individual microphones, and truly allow "hands free telephony" for PICTUREPHONE Meeting Service.

Modifications of this acoustic direction identification system are also possible and may obviously be implemented by those skilled in the art without departing from the spirit and scope of the invention. It is to be understood, therefore, that within the scope of the appended claims, the invention maybe practiced otherwise than as specifically described.

What is claimed is:

1. A signal processing arrangement having first and second spatially separated sound detecting devices responsive to sound from a common sound source, the arrangement comprising:
   means for providing a first pulse and a second pulse corresponding to an energy burst of sound detected in the detecting devices, the first and second pulses respectively originating from the first and second sound detecting devices;
   means jointly responsive to the first and second pulse for determining a phase relationship between the energy burst of sound; and
   both a predetermined sound threshold level and energy burst storage means, an output signal reflecting the origin of the common sound source being provided in response to both the phase relationship of the energy bursts and the accumulated value of multiple energy bursts within a predetermined time period exceeding the value of the predetermined sound threshold level.

2. The signal processing arrangement in accordance with claim 1 wherein the means jointly responsive to the first and second pulse for determining a phase relationship between the energy bursts of sound further comprises means for detecting the occurrence of the first pulse and means for detecting the occurrence of the second pulse, the time between the occurrence of the first pulse and the occurrence of the second pulse being a measure of the phase relationship.

3. The signal processing arrangement in accordance with claim 2 wherein the pulse detecting means comprises a timer that begins to count upon detecting the occurrence of the first pulse and stops counting upon detecting the occurrence of the second pulse, the value of the count being reflective of the origin of the common sound source.

4. The signal processing arrangement in accordance with claim 2 wherein the pulse detecting means comprises a timer that begins to count upon detecting the occurrence of the second pulse and stops counting upon detecting the occurrence of the first pulse, the value of the count being reflective of the origin of the common sound source.

5. The signal processing arrangement of claim 2 further comprising inhibiting means for preventing an output signal reflecting the origin of common sound sources from being provided, the inhibiting means being operative when the time between the occurrence of the first pulse and the occurrence of the second pulse is greater than a second predetermined time period.

6. The signal processing arrangement in accordance with claim 1 wherein the means jointly responsive to the first and second pulse for determining a phase relationship betwen the energy bursts of sound generates a third pulse reflective of the origin of the common sound source, and the energy burst storage means includes memory means for storing a unit in memory in response to generation of the third pulse.

7. The signal processing arrangement in accordance with claim 6 where the memory means includes multiple memory sections assigned for respective storage of those units reflective of sound sources originating from each one of a plurality of directions.

8. The signal processing arrangement in accordance with claim 7 wherein eahc one of the multiple memory sections in the memory means commonly stores initial and subsequent units occurring in time, these units being reflective of sound sources originating from the same direction, the selected memory section incrementally increasing its unit value upon receiving each assigned third pulse, the accumulated units being reflective of the accumulated value of multiple energy bursts.

9. The signal processing arrangement in accordance with claim 1 wherein the means jointly responsive to the first and second pulse for determining a phase relationship between the energy bursts of sound generates a third pulse reflective of the origin of the common sound source, and the energy burst storage means includes multiple memory means, each one of the multiple memory means storing a unit in memory in response to generation of the third pulse.

10. The signal processing arrangement in accordance with claim 9 where each memory means includes multiple memory sections assigned for respective storage of those units reflective of sound sources originating from each one of a plurality of directions.

11. The signal processing arrangement in accordance with claim 8 or 10 wherein each selected multiple memory section is incremented by a predetermined unit value when the accumulated value of the multiple energy bursts within the predetermined time period exceeds the value of the predetermined sound threshold.

12. The signal processing arrangement in accordance with claim 8 or 10 wherein the multiple memory sections are initialized to zero with all units stored therein being removed when the accumulated value of the multiple energy bursts within the predetermined time period does not exceed the value of the predetermined sound threshold level.

13. The signal processing arrangement in accordance with claim 10 wherein each one of the multiple memory sections in the multiple memory means commonly stores initial and subsequent units occurring in time, these units being reflective of sound sources originating from the same direction, a selected memory section incrementally increasing its unit value upon receiving each assigned third pulse, and the accumulated units being reflective of the accumulated value of multiple energy bursts.

14. The signal processing arrangement in accordance with claim 13 wherein the predetermined time period for each of the multiple memory means is staggered in time with the time periods for other of the multiple memory means so that the output signals associated with each multiple memory means are provided in an alternating manner.

15. The signal processing arrangement in accordance with claim 10 wherein a first and a second multiple memory section from the multiple memory sections located operationally adjacent to the selected multiple memory section for selected storage of those units reflective of the next nearest sound source position are also initialized to a predetermined unit value.

16. The signal processing arrangement in accordance with claim 15 wherein the unit value of the first and second multiple memory sections is one-half the unit value of the selected memory section.

17. A signal processing arrangement having first and second spatially separated sound detecting devices responsive to sound from a common sound source, the arrangement comprising:
  means for providing a first pulse and a second pulse corresponding to an energy burst of sound detected in the detecting devices, the first and second pulses respectively originating from the first and second sound detecting devices;
  means jointly responsive to the first and second pulse for determining a phase relationship between the energy burst of sound; and
  both a predetermined sound threshold level and multiple energy burst storage means, an output signal associated with each storage means reflecting the origin of the common sound source being provided in response to both the phase relationship of the energy bursts and the accumulated value of multiple energy bursts in each storage means exceeding the value of the predetermined sound threshold level within a time period predetermined for each storage means.

18. The signal processing arrangement in accordance with claim 1 or 17 wherein the means for providing the first pulse and the second pulse comprises means for dividing an energy burst of sound detected in the first sound detecting device being into first and second energy burst signals, the second energy burst signal being out of phase with the first energy burst signal, and energy burst of sound detected in the second sound detecting device divided into third and fourth energy burst signals, the fourth energy burst signal being out of phase with the third energy burst signal.

19. The signal processing arrangement of claim 18 wherein the phase difference between the first and second energy burst signals is ninety degrees, and the phase difference between the third and fourth energy burst signals is ninety degrees.

20. The signal processing arrangement of claim 18 wherein the first and second energy burst signals are independently squared and then summed together for providing a fifth energy urst signal, and the third and fourth energy burst signals are independently squared and then summed together for providing a sixth energy burst signal.

21. The signal processing arrangement in accordance with claim 20 wherein the means for providing the first pulse further includes means for selecting the first pulse corresponding to the fifth energy burst signal, a first pulse occurring only after the absence of fifth energy burst signals for a predetermined time, and means for selecting a second pulse corresponding to the sixth energy burst signal, a second pulse occurring only after the absence of sixth energy burst signals for a predetermined time.

22. The signal processing arrangement of claim 17 wherein the predetermined time periods for each of the multiple storage means are equal.

23. The signal processing arrangement in accordance with claim 22 wherein the predetermined time period for each of the multiple energy burst storage means is staggered in time with the time periods for other of the multiple energy burst storage means so that the output signals associated with each energy burst storage means are provided in an alternating manner.

24. The signal processing arrangement in accordance with claim 17 wherein the means jointly responsive to the first and second pulse for determining a phase relationship between the energy bursts of sound generates a third pulse reflective of the origin of the common sound source, and the energy burst storage means includes multiple memory means, each one of the multiple memory means storing a unit in memory in response to generation of the third pulse.

25. The signal processing arrangement in accordance with claim 24 wherein each of the multiple memory means includes multiple memory sections assigned for respective storage of those units reflective of sound sources originating from each one of a plurality of directions.

26. The signal processing arrangement in accordance with claim 25 wherein each one of the multiple memory sections in the multiple memory means commonly stores initial and subsequent units occurring in time, these units being reflective of sound sources originating from the same direction, a selected memory section incrementally increasing its unit value upon receiving each assigned third pulse, and the accumulated units being reflective of the accumulated value of multiple energy bursts.

27. The signal processing arrangement in accordance with claim 25 wherein the multiple memory sections are initialized to zero with all units stored therein being removed when the accumulated value of the multiple energy bursts within the predetermined time period does not exceed the value of the predetermined sound threshold level.

28. The signal processing arrangement in accordance with claim 25 wherein each selected multiple memory section is incremented by a predetermined unit value when the accumulated value of the multiple energy bursts within the predetermined time period exceeds the value of the predetermined sound threshold.

29. The signal processing arrangement in accordance with claim 28 wherein a first and a second multiple memory section from the multiple memory sections located operationally adjacent to the selected multiple memory section for selected storage of those units reflective of the next nearest sound source position are also initialized to a predetermined unit value.

30. The signal processing arrangement in accordance with claim 29 wherein the unit value of the first and second multiple memory sections is one-half the unit value of the selected memory section.

31. The signal processing arrangement in accordance with claim 17 wherein the means jointly responsive to the first and second pulse for determining a phase relationship between the energy bursts of sound further comprises means for detecting the occurrence of the first pulse and means for detecting the occurrence of the second pulse, the time between the occurrence of the first pulse and the occurrence of the second pulse being a measure of the phase relationship.

32. The signal processing arrangement of claim 31 further comprising inhibiting means for preventing an output signal reflecting the origin of common sound sournces from being provided, the inhibiting means being operative when the time between the occurrence of the first pulse and the occurrence of the second pulse is greater than a second predetermined time period.

33. The signal processing arrangement in accordance with claim 31 wherein the pulse detecting means comprises a timer that begins to count upon detecting the occurrence of the first pulse and stops counting upon detecting the occurrence of the second pulse, the value of the count being reflective of the origin of the common sound source.

34. The signal processing arrangement in accordance with claim 31 wherein the pulse detecting means comprises a timer that begins to count upon detecting the occurrence of the second pulse and stops counting upon detecting the occurrence of the first pulse, the value of the count being reflective of the origin of the common sound source.

35. A signal processing arrangement having first and second spatially separated sound detecting devices responsive to sound from a common sound source, the arrangement comprising:

means for providing a first pulse and a second pulse corresponding to an energy burst of sound detected in the detecting, the first and second pulses respectively originating from the first and second sound detecting devices;

means jointly responsive to the first and second pulse for determining a phase relationship between the energy burst of sound; and energy burst storage means, an output signal reflecting the origin of the common sound source being provided in response to both the phase relationship of the energy bursts and an accumulated value of multiple energy bursts occurring within a predetermined time period.

36. A signal processing arrangement having first and second spatially separated sound detecting devices responsive to sound from a common sound source, the arrangement comprising:

means for providing a first pulse and a second pulse corresponding to an energy burst of sound detected in the detecting devices, the first and second pulses respectively originating from the first and second sound detecting devices;

means jointly responsive to the first and second pulse for determining a phase relationship between the energy burst of sound; and multiple energy burst storage means, an output signal associated with each storage means reflecting the origin of the common sound source and being provided in response to both the phase relationship of the energy bursts and the accumulated value of multiple energy bursts occurring in each storage means within a time period predetermined for each storage means.

* * * * *